United States Patent

[11] 3,590,423

[72] Inventor Thomas V. Messer
 747 Olympic Ave., Edmonds, Wash. 98020
[21] Appl. No. 350
[22] Filed Jan. 2, 1970
[45] Patented July 6, 1971

[54] CLEANING APPARATUS FOR FISH
 9 Claims, 3 Drawing Figs.
[52] U.S. Cl. .................................................. 17/53,
 43/55, 17/70
[51] Int. Cl. .................................................. A22c 25/06
[50] Field of Search .................................... 17/70, 53,
 55; 43/55, 4

[56] References Cited
UNITED STATES PATENTS
2,485,684 10/1949 Aldredge, Sr. ............... 43/55
2,928,118 3/1960 Hairston ....................... 17/64
3,140,691 7/1964 Stark ............................ 43/55 X Primary Examiner—Lucie H. Laudenslager
Attorney—Thomas W. Secrest ABSTRACT: My invention is directed to a cleaning apparatus for fish and which apparatus may be attached to the gunwale of a small fishing boat. The apparatus comprises a rack having a wide, open top and a small or narrow, open bottom. It is possible to clean the fish so as to allow the waste products to fall through the narrow, open bottom. However, the narrow, open bottom prevents the fish from falling through and out of the rack.

In addition, there may be placed a tray on top of the rack. The tray provides a working platform for cleaning small fish. The waste products of the small fish may be pushed outside of the tray so as to fall into the water. Further, the tray provides a working platform for cutting up fish and other materials to use as bait while fishing.

When the rack and tray are no longer needed in the fishing trip, the tray may be removed from the rack and washed in the water. Then the rack may be removed from the gunwale of the boat and washed in the water. Then, the rack and tray may be stored until needed on the next fishing trip.

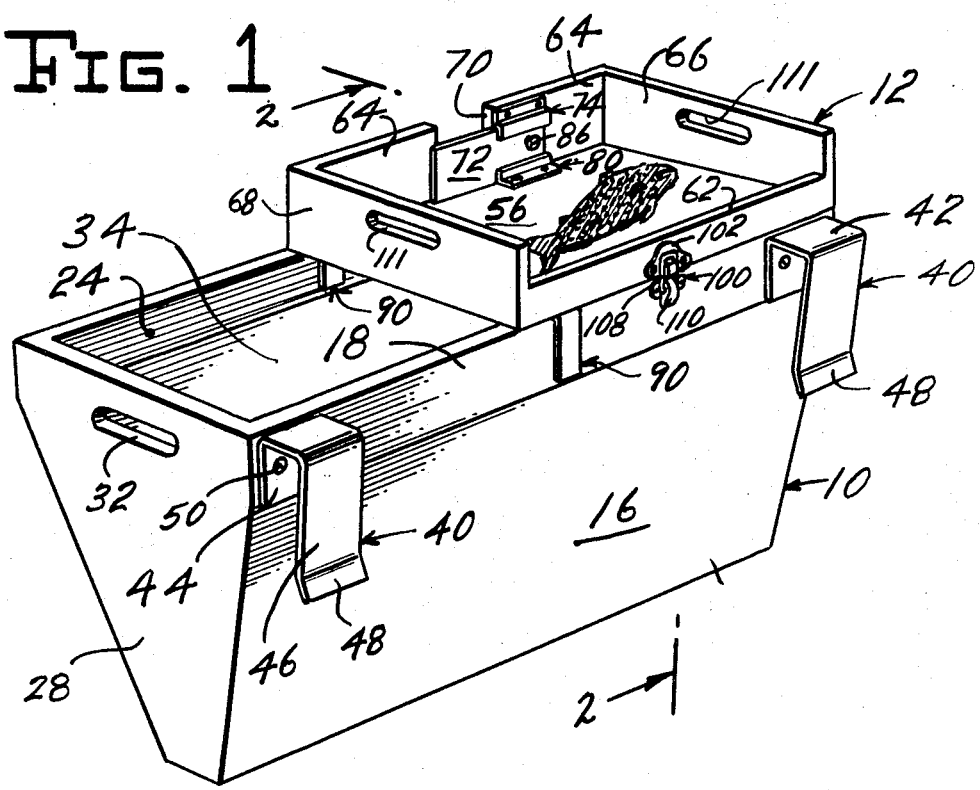
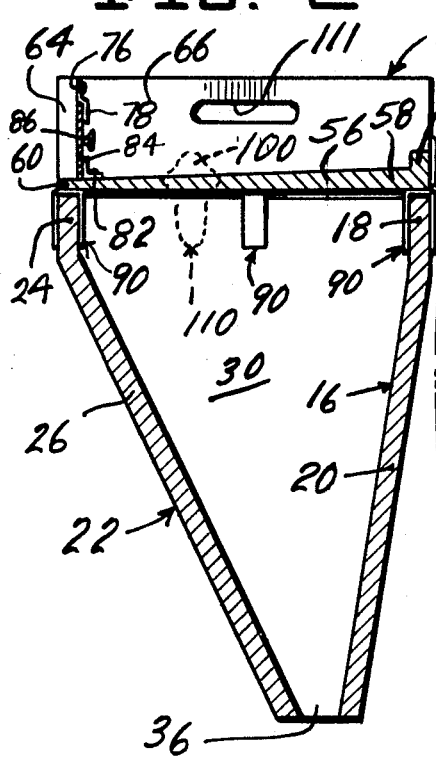
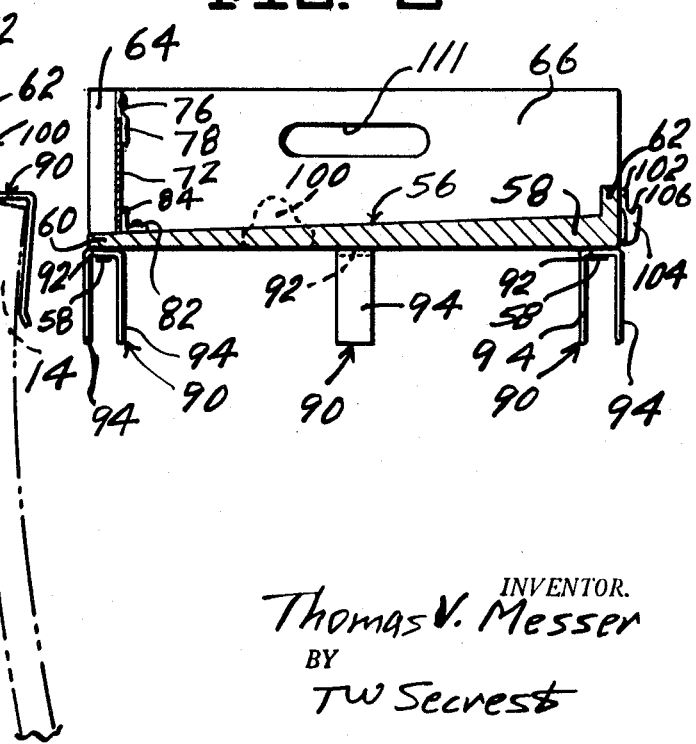
INVENTOR.
Thomas V. Messer
BY TW Secrest
ATTORNEY.

CLEANING APPARATUS FOR FISH

When fishing in a small boat, and if the fisherman be lucky, it is often necessary to clean the caught fish. Some fishermen, because of a fear of losing the fish if they clean the fish outside the boat, clean the fish inside the boat. There results a general untidiness because entrails, scales, fins, and the like fall onto the boat. In addition to this, these waste products in the bottom of the boat are a hazard if a person steps or moves in the boat because of the possibility of slipping.

With this in mind I have invented a cleaning apparatus for the fish and which apparatus may be attached to the gunwale of a small boat. The part attached to the gunwale of a small boat is a cleaning rack having a wide, open top and a narrow, open bottom. For the larger fish it is possible to clean these fish over or in this rack so that the entrails, fins, scales, and the like fall through the narrow, open bottom. If the fish happens to slip out of the hands of the fisherman, the fish will not fall through the narrow, open bottom of the rack. In addition, I employ a tray which fits onto the upper part of the rack. This tray has a working platform and sides. The smaller fish may be cleaned in the tray and the waste products pushed overboard into the water. In addition, the working platform of the tray may be used for cutting small fish for bait or for cutting other material for bait.

An object of this invention is to provide a cleaning apparatus for fish which makes it possible to clean the fish outside the boat and thereby increase safety inside the boat; to provide such apparatus which can be readily attached to and readily removed from the gunwale of the boat; to provide such a cleaning apparatus which can be easily stored from fishing trip to fishing trip; to provide a cleaning apparatus for fish which is adaptable for both small fish and for large fish; to provide such a cleaning apparatus which is trough-shaped for large fish so that the waste products pass through the bottom of the apparatus but that the fish are too large to pass through the bottom of the apparatus; to provide a two-piece cleaning apparatus for fish, which two-piece cleaning apparatus comprises a rack and a tray and which rack and tray can be easily assembled and easily disassembled from each other; to provide a cleaning apparatus having a region and storage area for cleaning of the fish and automatic disposal of the entrails as the entrails can fall through the bottom of the apparatus and into the water; to provide an apparatus for fish cleaning and washing of the fish outside the boat so that the boat is maintained clean; to provide an apparatus whereby the rack and tray can be easily removed from each other and also easily removed from the gunwale of the boat and washed in the water outside the boat; to provide a fish cleaning apparatus having a useful working platform for cutting fish and other materials for bait; to provide a fish cleaning apparatus which lessens the time required to maintain the boat in a clean condition; and to provide such an apparatus which is inexpensive to manufacture.

These and other important objects and advantages of the invention will be more particularly brought forth upon reference to the accompanying drawings, the detailed description of the invention, and the appended claims.

In the drawings:

FIG. 1 is a perspective view of the fish cleaning apparatus and illustrates the rack having a wide, open top and a narrow, open bottom and also illustrates the tray as positioned on the rack and which tray provides a working platform for cutting small fish and for cutting bait and the like;

FIG. 2, taken on line 2-2 of FIG. 1, is a vertical, lateral, cross-sectional view illustrating the cleaning apparatus comprising the lower rack which is positioned on the gunwale of the boat and the cleaning tray positioned on the rack; and FIG. 3 is a vertical, lateral, cross-sectional view of the tray and illustrates the working platform which slopes outwardly from the inner edge and also illustrates the means for attaching the working platform to the rack.

In FIGS. 1, 2, and 3, there is illustrated the fish cleaning apparatus. This apparatus comprises the rack 10 and a tray 12. In FIG. 2 there is illustrated a gunwale 14 of a boat such as a rowboat, small fishing boat, or a small pleasure boat used for fishing purposes.

The rack 10 comprises an inner side 16 having an upper edge 18 and a lower main body portion 20. It is seen that the upper edge 18 and the lower main body portion 20 are at an angle with respect to each other and that the lower main body portion 20 slopes away from or is directed away from the side of the boat 14.

The rack 10 also has an outer side 22. The outer side 22 has an upper edge 24 and a lower main body portion 26. It is seen that the lower main body portion 26 and the upper edge 24 are at an angle with respect to each other and that the lower main body portion 26 is directed toward the lower main body portion 20 of the inner side 16.

Also, the rack 10 has an end 28 and an end 30. The ends 28 and 30 are between the inner side 16 and the outer side 22. In the ends 28 and 30 there is a slot 32 for a hand or finger hold.

In FIGS. 1 and 2 it is seen that the rack has a wide, open top 34 and a narrow, open bottom 36. The rack is longer than it is wide. The rack may be approximately 18 inches to 3 feet long. The wide, open top is much wider than the narrow, open bottom. This makes it possible to clean a relatively large fish in or over the rack 10. The entrails, scales, fins, and waste products fall through the narrow, open bottom 36 but the fish is too large to fall through the narrow, open bottom 36. Therefore, if the fisherman accidentally drops the fish or the fish slips out of the hands of the fisherman, it will not be lost to the fisherman but will stay inside the rack 10 because of the narrow, open bottom 36.

It is seen in FIGS. 1 and 2 that the upper edges 18 and 24 are straight and substantially parallel to each other. This makes it possible to readily place the tray 12 on top of the upper edges of the rack 10.

In FIGS. 1 and 2 it is seen that there are two generally U-shaped flexible clamps 40 having a base 42, a short leg 44, a long leg 46 with an outwardly directed tip 48. In FIG. 1 it is seen that near each end of the inner side 16 there is positioned one of these flexible clamps 40. The flexible clamp 40 may be attached to the upper edge 18 of the inner side 16 by means of a screw 50, or by a bolt and nut, rivet or may be part of molded one piece rack 10.

In FIG. 2 it is seen that the rack 10 is positioned over the gunwale 14 so that the long leg 46 is inside the boat and the rack 10 is outside the boat.

The tray 12 comprises a bottom or platform 56 and which platform is thicker, see FIG. 3, at the right portion 58 and narrower at the left portion 60. In other words, the bottom 56 tapers inwardly from the thick portion 58 to the narrow portion 60, or tapers inwardly from the inner side 62 to the outer side 64.

In the drawings it is seen that the inner side 62 is of a narrow height and more nearly approaches that of a lip so as to preclude waste products from spilling over from the bottom 56 and into the boat. Also, the narrow side 62 makes it possible for a fisherman to readily position his hands in the tray 12 for cleaning small fish, cutting small fish and other material into bait for fishing purposes. The tray 12 also has an end 66 and an end 68.

In the outer side 64 there is an opening 70. This opening 70 makes it possible to brush or move the waste products from the bottom of the tray 56 and into the water. There is a cover or a door 72 for the opening 70. Also, there is a guide means for guiding this cover or door 72. On the inner surface of one of the sides 64 there is an upper guide 74 having a base 76 and an outwardly directed flange 78. At the junction of the bottom 56 and the same side 64, there is a guide 80 having a base 82 attached to the bottom and a leg 84. The leg 84 is spaced apart from the side 64. The cover or door 72 is positioned between the outwardly directed flange 78 in the side 64 and also between the leg 84 and the side 64. There is a handle 86 on the cover or door 72.

A fisherman, upon catching a small fish, can use the bottom 56 as a working platform and clean the fish. Then, the fisherman can slide the door 72 so that the opening 70 is open and by means of his hands or tools, can brush the waste products from the fish through the opening 70 and into the ocean. Then, the door or cover 72 can be closed so that the fish cannot fall through the opening and into the water.

The tray 12 is positioned on the upper edge 18 of the inner side 16 and on the upper edge 24 of the outer side 22 and also on the upper edge of the end 30 by means of generally U-shaped brackets 90 having a base 92 having two legs 94. The base 92 of the bracket 90 may be attached to the bottom 56 of the tray 12 by means of screws 58. It is seen, see FIGS. 1 and 2, that the legs 94 slip over the outer surfaces of the upper edges 18 and 24 and end 30 to position the tray on rack 10.

In addition, there is a locking means 100 having a base 102 on the inner side 62 of the tray 12. This base 102 has a knob or catch 104 with a recess 106. On the outer surface of the upper edge 18 of the inner side 16 there is a catching means 108 attached to a handle and base 110. The catch means 108 can be positioned over the knob 104 and in the recess 106 and then the handle rotated so as to firmly position the tray 12 onto the rack 10. In FIG. 2 it is seen that on the outer surface of the end 30 of the rack 10 and also on the outer surface of the end 66 of the tray 12 there is a locking means 100. With these two locking means 100, the tray 12 is firmly positioned onto the rack 10.

In the ends 66 and 68 of the tray 12 there is a passageway 111 or a groove 111 for a handhold for a fisherman to pick up the tray 12 from the rack 10.

A fisherman, after having cleaned fish in the rack 10 on in the tray 12, or both the rack 10 and tray 12, may unlock the locking means 100, remove the tray 12 from the rack 10 and wash the tray 12 in the water. Likewise, the fisherman may remove the rack 12 from the gunwale of the boat and wash the rack 10 in the water. In this manner the tray and rack are cleaned and may be readily stored until the next fishing trip.

From the foregoing, it is seen that I have provided a cleaning apparatus for cleaning fish, cutting up fish and other materials for bait for fishing, and which cleaning apparatus makes it possible to safely clean the fish outside the boat and with the feeling that the fish will not slip out of the fisherman's hands and into the water. If, unfortunately, the fish slips out of the fisherman's hands or that the fisherman drops the fish, the fish will fall into the tray 12 or into the rack 10 so that the fisherman has not lost his fish. Further, by cleaning the fish outside the boat, the entrails, scales, and fins are allowed to drop into the water and not into the boat so that the boat is therefore cleaner, more sanitary, and safer from the standpoint that the bottom of the boat is not slippery. Another important consideration is that with the waste products of the fish thrown overboard it is not necessary to take as much time to clean the boat. The boat is not as dirty as when the fish are cleaned inside the boat and therefore it is not as time-consuming to clean out the boat that has normal material such as paper, line and leader, instead of waste products such as fish entrails, fins and scales.

The materials of construction of the rack 10 and the tray 12 may be wood, plastic in either solid and fabricated form or in molded form, or may be of suitable metal, or combinations of these materials. Also, the rack and the tray may have locking hinges and be collapsible for ease of storage.

In addition, to mounting the rack 10 on a gunwale, it is possible to mount the rack on a stern of a boat, and, when appropriate, on the square bow of a boat.

What I claim is:
1. An apparatus for use in the cleaning of fish, said apparatus comprising:
 a. a rack having an inner side and an outer side and ends connecting said sides;
 b. said sides at the top of the rack being relatively far apart to have a relatively wide opening at the top of the rack;
 c. said sides at the bottom of the rack being relatively close together to have a relatively narrow opening at the bottom of the rack; and,
 d. a first means for removably attaching said rack to the gunwale of a boat.

2. An apparatus for use in the cleaning of fish, according to claim 1 and comprising:
 a. the inner side having an upper edge and a lower main body portion sloping inwardly toward said outer side;
 b. the upper edge and the lower main body portion being at an angle with each other; and,
 c. the outer side having an upper edge and a lower main body portion sloping inwardly toward said inner side and with said upper edge and said lower main body portion being at an angle with each other.

3. An apparatus for use in the cleaning of fish according to claim 2 and comprising:
 a. said first means comprising a generally U-shaped flexible clamp having a leg spaced apart from said inner side for fitting over a gunwale so that the gunwale is between said inner side and said leg.

4. An apparatus for use in the cleaning of fish according to claim 1 and comprising:
 a. a tray having an inner side, an outer side, ends connecting said side and a bottom; and,
 b. a second means for removably attaching said tray to the upper part of said rack.

5. An apparatus for use in the cleaning of fish according to claim 4 and comprising:
 a. said inner side being of less height than said outer side and said ends so as, in effect, to have a lip above said bottom;
 b. an opening in said outer side for disposal of waste; and,
 c. a removable cover for said opening.

6. An apparatus for use in the cleaning of fish according to claim 5 and comprising:
 a. said bottom being thicker near said inner side than near said outer side so that the upper surface of said bottom slopes down and away from said inner side upon going to said outer side;
 b. said cover being a sliding door;
 c. said second means comprising U-shaped brackets for fitting over the upper part of said rack; and,
 d. a locking means for locking together said rack and said tray.

7. An apparatus for use in the cleaning of fish according to claim 2 and comprising:
 a. a tray having an inner side, an outer side, ends connecting said sides and a bottom; and,
 b. a second means for removably attaching said tray to the upper part of said rack.

8. An apparatus for use in the cleaning of fish according to claim 7 and comprising:
 a. said inner side being of less height than said outer side and said ends so as, in effect, to have a lip above said bottom;
 b. an opening in said outer side for disposal of waste; and,
 c. a removable cover for said opening.

9. An apparatus for use in the cleaning of fish according to claim 8 and comprising:
 a. said bottom being thicker near said inner side than near said outer side so that the upper surface of said bottom slopes down and away from said inner side upon going to said outer side;
 b. said cover being a sliding door;
 c. said second means comprising U-shaped brackets for fitting over the upper part of said rack; and,
 d. a locking means for locking together said rack and said tray.